United States Patent [19]

Kato et al.

[11] Patent Number: 4,860,174
[45] Date of Patent: Aug. 22, 1989

[54] LIGHTING DEVICE FOR USE WITH VEHICLES

[75] Inventors: Akio Kato, Hadano; Hideo Naito, Tokyo, both of Japan

[73] Assignee: Ichikoh Industries, Ltd., Tokyo, Japan

[21] Appl. No.: 182,295

[22] Filed: Apr. 15, 1988

[30] Foreign Application Priority Data

Apr. 17, 1987 [JP] Japan ................................ 62-93290

[51] Int. Cl.$^4$ ............................................. B60Q 1/26
[52] U.S. Cl. ..................................... 362/61; 362/307; 362/311
[58] Field of Search .................... 362/61, 80, 248, 255, 362/256, 267, 268, 293, 351, 354; 340/815.31, 815.32, 84, 307, 311, 355

[56] References Cited

U.S. PATENT DOCUMENTS

| | | |
|---|---|---|
| 2,403,685 | 7/1946 | Sachtleben et al. ............ 340/815.32 |
| 2,907,249 | 10/1959 | Hjermstad ...................... 340/815.32 |
| 2,979,601 | 11/1957 | McClees ............................. 362/293 |
| 3,487,206 | 12/1969 | Dawson et al. ...................... 362/80 |
| 4,042,818 | 8/1977 | Green ................................ 362/293 |
| 4,241,388 | 12/1980 | Green ................................ 362/311 |
| 4,316,652 | 2/1982 | Auer Jr. et al. ................ 340/815.32 |
| 4,556,928 | 12/1985 | Lysoe ................................ 362/293 |
| 4,656,567 | 4/1987 | Morris .............................. 362/293 |
| 4,680,680 | 7/1987 | Iwaki et al. ......................... 362/61 |
| 4,695,928 | 9/1987 | Schauwecker et al. .............. 362/61 |
| 4,814,960 | 3/1989 | Liu ..................................... 362/311 |

FOREIGN PATENT DOCUMENTS

| | | |
|---|---|---|
| 2522609 | 5/1975 | Fed. Rep. of Germany ...... 362/293 |
| 2612837 | 10/1976 | Fed. Rep. of Germany ...... 362/293 |
| 2433155 | 4/1980 | France .............................. 362/293 |
| 2525322 | 10/1983 | France ................................ 362/61 |
| 211244 | 12/1983 | Japan ............................ 340/815.32 |

Primary Examiner—Ira S. Lazarus
Assistant Examiner—Sue Hagarman
Attorney, Agent, or Firm—Foley & Lardner, Schwartz, Jeffery, Schwaab, Mack, Blumenthal & Evans

[57] ABSTRACT

A lighting device for use with vehicles having a lens longer in the horizontal direction thereof and a transparent sheet attached to the back or front face of the lens wherein said transparent sheet is provided with light shielding portions whose density becomes lower and lower from one side of the sheet to the other side thereof.

24 Claims, 4 Drawing Sheets

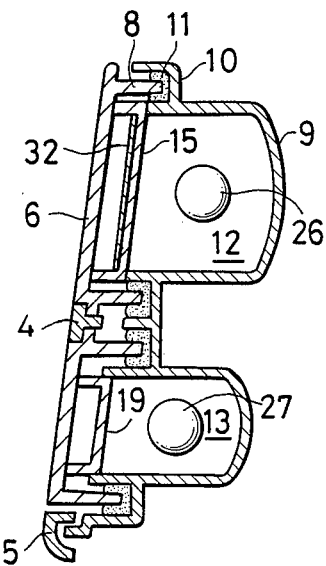
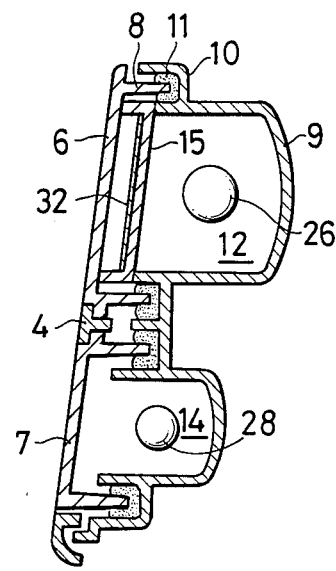
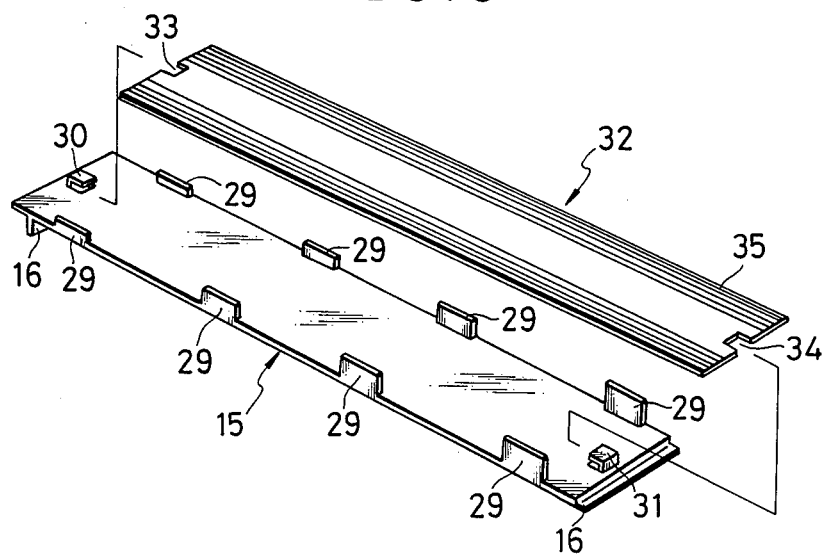

1

LIGHTING DEVICE FOR USE WITH VEHICLES

BACKGROUND OF THE INVENTION

1. Field of the Invention

The present invention relates to a lighting device such as the combination lamp provided with a lens longer in the horizontal directions thereof and attached to the exterior of vehicles.

2. Prior Art

In the case of the rear combination lamp, for example, having a lens longer in the horizontal direction thereof, the tail stop lamp which emits red light, the turn signal lamp which emits orange light, and the backup lamp which emits white light are combined with one another to form the lighting device. The tail stop lamp is a combination of the tail lamp which informs persons behind of the presence of a vehicle at night and the stop lamp which emits light when the vehicle is braked. The turn signal lamp serves to tell the change of that lane on which the vehicle is running and the backup lamp serves to illuminate behind and tell that the vehicle is to move backward.

In the case of this lighting device, however, there arises the problem of false lighting. This is a phenomenon that sun light strikes against the lighting device and its is reflected by the prism on the back of the lens or the reflector in the lighting device in the daytime to show as if the lighting device were lit. This phenomenon is also sometimes caused at night when the lighting device is illuminated by the light of headlamps of other vehicles.

When this false lighting is seen at the tail stop lamp, for example, there is a danger that the vehicle behind puts on an emergency brake, misconceiving that its preceding vehicle has been braked, to thereby make persons ridden together in it feel almost dangerous or cause it to be clashed from behind.

In order to prevent this false lighting, plural light shielding stripes which serve to shield light entering from outside are arranged on the front or back of the conventional lens in the horizontal direction thereof, but they are arranged uniformly on the whole surface of the lens to thereby reduce the light distributing capacity of the lighting device.

Further, a trend has arisen these days that the lighting devices are made thinner. When the lighting devices are made so, they can be made lighter in weight and their material cost can be reduced. In the case of the rear combination lamp, the volume of the trunk room can be made larger. When the lighting devices are made thinner like this, however, they cannot give any profound feeling to persons who see them from their lens side, and they also cannot satisfy those people who have asked these days to have goods of high grade.

SUMMARY OF THE INVENTION

The object of the present invention is to provide a lighting device for use with vehicles, said lighting device being excellent in design and capable of preventing its false lighting without reducing its light distributing capacity so much.

The lighting device for use with vehicles according to the present invention is characterized in that is has a transparent sheet attached to the back or front of a lens longer in the horizontal direction thereof and that the transparent sheet has light shielding portions whose density becomes lower and lower from one side of the transparent sheet to the other side thereof.

Even when sun light enters into the lens of the lighting device, it is shielded by those light shielding portions whose density becomes lower and lower from one side of the lens to the other side thereof, thereby enabling the false lighting to be prevented. Since the light shielding portions become lower and lower in density from one side to the other side, the profound feeling can be created to make the lighting device excellent in design without lowering the light distributing capacity of the lighting device so much.

BRIEF DESCRIPTION OF THE DRAWINGS

FIG. 4 is a sectional view taken along a line IV—IV in FIG. 1.

FIG. 5 is a sectional view taken along a line V—V in FIG. 1.

FIG. 6 is a perspective view showing an inner lens and a transparent sheet in the lighting device of FIG. 1 dismantled.

DETAILED DESCRIPTION OF THE PREFERRED EMBODIMENTS

Figure 1:
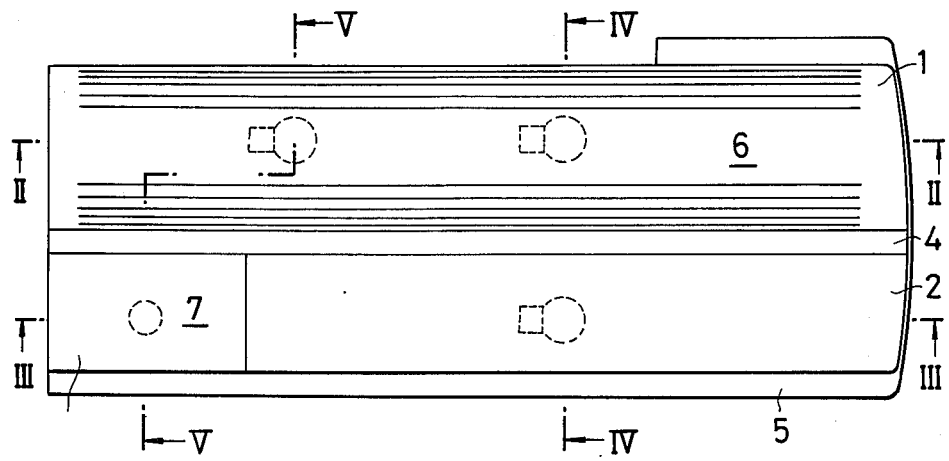
FIG. 1 is a front view showing an example of the lighting device for use with vehicles according to the present invention.

FIG. 1 shows an example of the lighting device according to the present invention. This lighting device is made as the rear combination lamp longer in the horizontal direction thereof and having a tail stop lamp 1 at the upper portion thereof, a turn signal lamp 2 and a backup lamp 3 at the lower portion thereof, a lace 4 extending in the horizontal direction at the center portion thereof, and a rim 5 along the outer circumference thereof.

A front lens means comprises an outer colorless and transparent lens 6 common to the tail stop and turn signal lamps 1 and 2, and a colorless and transparent smoke-treated lens 7 connected integral to the outer lens 6 and intended for the backup lamp 3. As shown in FIGS. 2 through 5, this front lens means is attached to a housing 9 in such a way that a leg 8 formed integral along the outer rim of the lens means is fixed in a groove 10 by a hot melt 10; said groove 10 being also formed integral along the outer rim of the housing 9.

Figure 2:
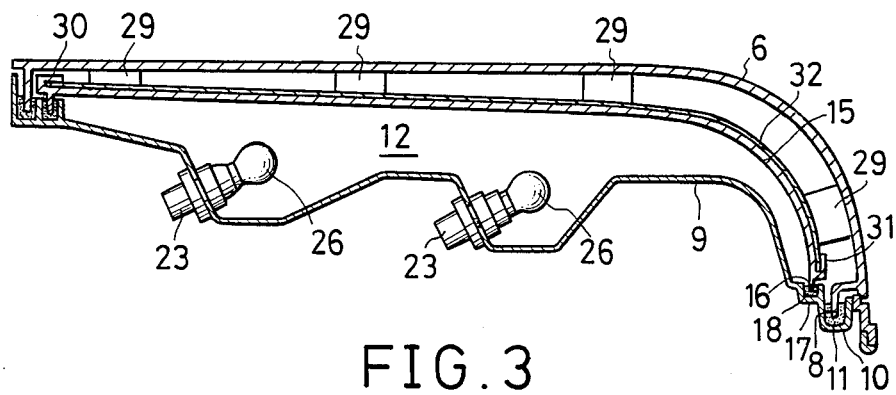
FIG. 2 is a sectional view taken along a line II—II in FIG. 1.
Figure 3:
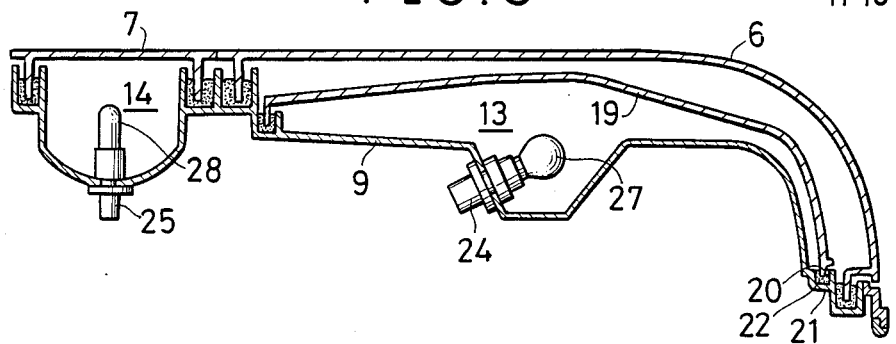
FIG. 3 is a sectional view taken along a line III—III in FIG. 1.

The housing 9 is partitioned into a chamber 12 for the tail stop lamp 1, a chamber 13 for the turn signal lamp 2 and a chamber 14 for the backup lamp 3. As shown in FIG. 2, an inner lens 15 which is red and transparent and which is provided with a fish-eye prism on its front face and a Fresnel prism on its back face is arranged in front of the tail stop lamp chamber 12 in such a way that legs 16 along both ends of the inner lens 15 are fixed in inner grooves 17 of the housing 9 by a hot melt 18. As shown in FIG. 3, an inner lens 19 which is orange and transparent and which is provided with a fish-eye prism on its front face and a Fresnel prism on its back face is arranged in front of the turn signal lamp chamber 13 in such a way that legs 20 along both ends of the inner lens 19 are fixed in inner grooves 21 of the housing 9 by a hot melt 22. No inner lens but an outer lens 7 only is arranged in front of the backup lamp chamber 14. Sockets 23, 24 and 25 detachably attached to the housing 9 are located in the lamp chambers 12, 13 and 14, respectively, and bulbs 26, 27 and 28 are screwed into the sockets 23, 24 and 25.

As shown in FIG. 6, the inner lens 15 for the tail stop lamp is usually made as a plain plate (the prisms on its front and back faces are omitted in FIG. 6), and it is provided with guide projections 29 formed integral on its front face along its both sides and with engaging claws 30 and 31 formed integral on its front face at its both ends. A transparent sheet 32 on which graduation patterns are printed is placed on the front face of the inner lens 15 in such a way that cut-away portions 33 and 34 at both ends of the transparent sheet 32 are engaged with the engaging claws 30 and 31 of the inner lens 15. The inner lens 15 thus engaged with the sheet 32 is curved backward and fixed in the inner grooves 17 of the housing 9 and the outer lens 6 is then fixed in the outer groove 10 of the housing 9, as shown in FIG. 2. When arranged like this, the guide projections 29 of the inner lens 15 are resiliently contacted with the back face of the outer lens 6 to keep the inner lens 15 curved. The outer lens 6 is previously curved to correspond to the the inner lens 15 which is to be curved later.

The transparent sheet 32 is a sheet of film made of polycarbonate resin and provided with the graduation patterns printed in black ink on the front face thereof. The graduation pattern comprises light shielding portions 35 whose density becomes lower and lower from the upper side of the transparent sheet 32, longer in the horizontal direction thereof, to the lower side thereof.

Figure 7:
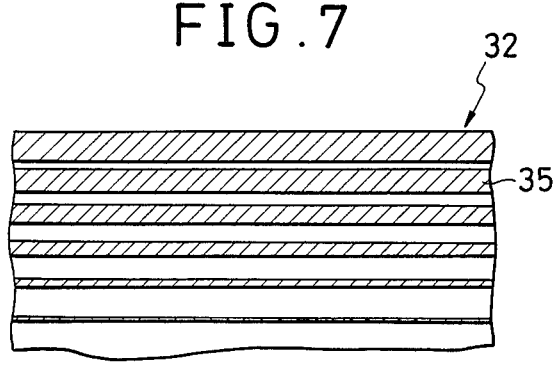
FIGS. 7 through 9 are front views showing a part of the transparent sheet on which various kinds of graduation patterns are formed.
Figure 8:
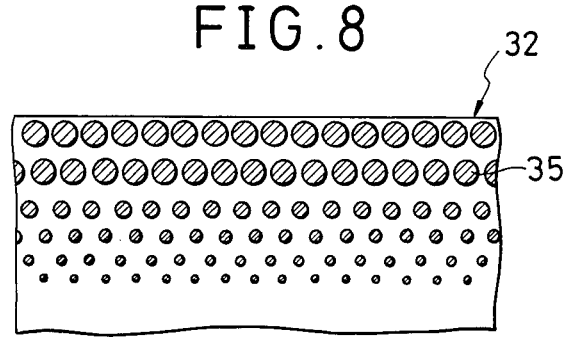
Figure 9:
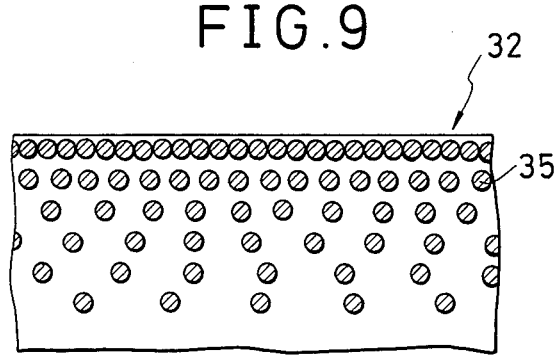

The light shielding portions 35 may be straight lines each having same width and arranged from the upper side of the sheet 32 to the lower side thereof in such a way that the interval between the adjacent lines becomes longer and longer as it comes nearer to the lower side of the sheet 32. Or it may be arranged that the lines are made smaller and smaller in width while the interval between the adjacent lines becomes longer and longer as they come nearer to the lower side of the sheet 32, as shown in FIG. 7. The light shielding portions 35 may be dots instead of the lines, as shown in FIG. 8. When the light shielding portions 35 are dots, it may be arranged that the dots are made smaller and smaller in diameter while the interval between two dots which are adjacent to each other in the horizontal direction is made longer and longer as they come nearer to the lower side of the sheet 32. Or it may be arranged that the dots are made same in diameter and located at a same interval in the vertical direction but that the interval between two dots which are adjacent to each other in the horizontal direction is made longer and longer as it comes nearer to the lower side of the sheet 32, as shown in FIG. 9. The light shielding portions 35 may be various kinds of other shape such as rectangular or heart shape; symbols like letters and numerals, and combinations of them.

Figure 10:
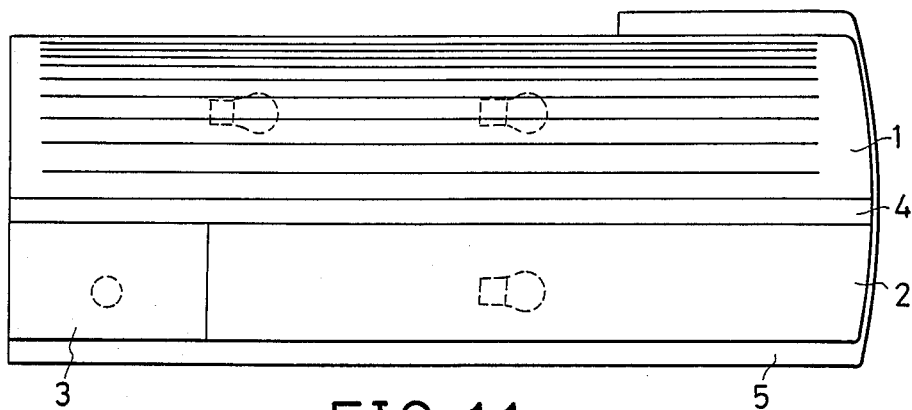
FIG. 10 is a front view showing another example of the lighting device according to the present invention.

In the case of the sheet 32 shown in FIG. 6, the graduation patterns are formed from the upper side of the transparent sheet 32 to the center thereof and from the lower side to the center thereof, keeping their density lower and lower as it comes nearer to the center of the sheet 32, but the graduation pattern may be formed from the upper side of the sheet 32 to the lower side thereof only in one direction, keeping its density lower and lower as it comes nearer to the lower side of the sheet 32, as shown in FIG. 10. Or the light shielding portions 35 may be made lighter and lighter in color as they come nearer to the lower side of the sheet 32, and various kinds of color may be used as the light shielding portions 35 in addition to black.

Figure 11:
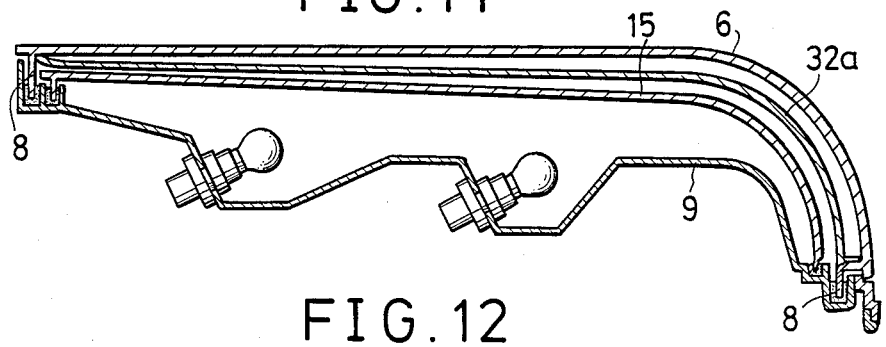
FIG. 11 is a sectional view, similar to FIG. 2, showing a further example of the lighting device according to the present invention.

Although the transparent sheet 32 has been attached to the front face of the inner lens 15 for the tail stop lamp in the above-described example, a transparent sheet 32a provided with the graduation pattern may be resiliently deformed and engaged with the inner sides of the legs 8 at both ends of the outer lens 6, as shown in FIG. 11. The transparent sheet may be attached to the back face of the inner lens 15, or to the front or back face of the outer lens 6 and the attaching of the sheet to them may be done according to the various kinds of well-known techniques such as bonding and fitting. Or it may be arranged that the outer lens 6 is made detachable from the housing 9 and that the transparent sheets 32 and 32a are exchanged by other transparent sheets which are different in the graduation pattern. These transparent sheets may be used for the turn signal and backup lamps 2 and 3.

These graduation patterns may be printed directly on the front or back face of plain lenses. Or the graduation patterns may be obtained in such a way that a smoke-treated paint of the acryl or urethane system is used changing its film thickness or that paints which are different in transmittance and chromaticity are coated one upon the other. These manners of using paints can be applied to uneven lenses and prisms.

The ultrasonic welding technique is used to attach the transparent sheet to the lens. The usual ultrasonic welding is attained at some points, using a top-chopped conical horn. The attaching of the transparent sheet to the lens does not need so much strength and the ultrasonic welding does not take so long time. Therefore, the ultrasonic welding is usually preferable.

When the transparent sheet is welded to the lens at some points, however, the transparent sheet is sometimes sooner expanded and curved between the welded points in the case where the lighting device is shone by the sun even if the transparent sheet and the lens are made of materials having same coefficient of linear expansion, because the transparent sheet is thinner than the lens. The transparent sheet thus curved cannot be seen from outside or not problem is caused even when the curved transparent sheet can be seen from outside, depending upon the structure of the lighting device. In a case where the outer lens is colorless and transparent, the graduation pattern is printed in black on the transparent sheet behind the outer lens, and that portion of the housing which is adjacent to the deepest black rim of the transparent sheet is white, the curving of the black rim of the transparent sheet is exaggerated and seems unnatural, contrasting with the white portion of the housing.

Figure 12:
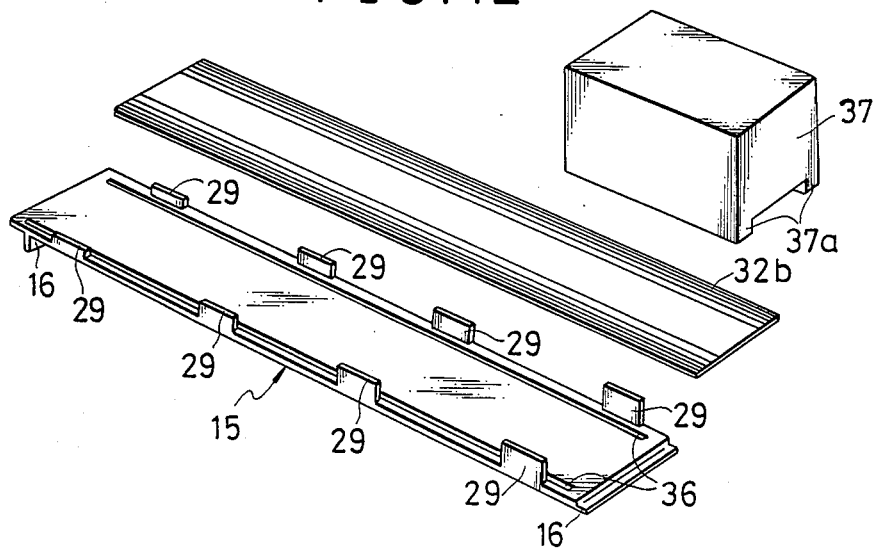
FIG. 12 is a perspective view showing an inner lens and a transparent sheet dismantled, together with a ultrasonic tool.

In the case of another example shown in FIG. 12, therefore, beads 36, triangular in section, are arranged on the front face of the inner lens 15 along the both longitudinal sides thereof and a transparent sheet 32b is ultrasonically welded onto the beads 36 at the both longitudinal sides thereof.

This ultrasonic welding is carried out in such a way that the beads 36 are pressed and ultrasonically vibrated from one end to the other end thereof by a rectangular ultrasonic tool 37 provided with legs 37a which correspond to the beads 36. Needless to say, the inner lens 15 is supported on the cradle.

When the inner lens 15 is not plain but curved from the first as shown in FIG. 2, the ultrasonic welding is applied only to the linear portion of the front face of the inner lens 15.

When the transparent sheet 32b is continuously welded like this to the front face of the inner lens 15 according to the ultrasonic welding technique, only the transparent sheet 32b is not curved at its welded portions even if the lighting device is heated by the sun, so that the both sides of the transparent sheet 32b can be kept linear. The transparent sheet 32b may be bonded to the back face of the outer lens 6, depending upon the lighting devices.

We claim:

1. A lighting device for use with a vehicle comprising:
   a lamp means;
   a lens means disposed to distribute light from said lamp means;
   a transparent sheet having disposed thereon means for shielding external light from said lighting device of the vehicle;
   said means for shielding external light comprising a graduated pattern of varying density disposed along at least a first edge of said transparent sheet, thereby shielding light in different amounts according to density.

2. The lighting device for use with vehicles according to claim 1 wherein said lens means includes outer and inner lenses and said transparent sheet is attached therebetween.

3. The lighting device for use with vehicles according to claim 2, wherein said graduated pattern comprises a plurality of straight lines extending on the transparent sheet in the longitudinal direction thereof parallel to said first edge.

4. The lighting device for use with vehicles according to claim 2 wherein said graduated pattern comprises a plurality of dots.

5. The lighting device for use with vehicles according to claim 2, wherein said graduated pattern comprises a plurality of letters, figures symbols or combinations thereof.

6. The lighting device for use with vehicles according to claim 2, wherein said graduated pattern is formed on the transparent sheet in decreasing density from said first edge to the center thereof and from a second edge parallel to said first edge to the center thereof, whereby the greatest amount of external light is shielded along said first and second edges.

7. The lighting device for use with vehicles according to claim 6, wherein said graduated pattern is formed on the transparent sheet in decreasing density from third and fourth edges perpendicular to said first and second edges to the center thereof.

8. The lighting device for use with vehicles according to claim 2 wherein said graduated pattern is printed on the transparent sheet.

9. The lighting device for use with vehicles according to claim 2 wherein said graduated pattern is colored in black.

10. The lighting device for use with vehicles according to claim 2, further comprising a housing defining a lamp chamber.

11. The lighting device for use with vehicles according to claim 2 wherein said transparent sheet is flexible.

12. The lighting device for use with vehicles according to claim 11 wherein said lens means and said transparent sheet are curved along end portions thereof.

13. The lighting device for use with vehicles according to claim 1 wherein said lens is provided with engaging portions while said transparent sheet is provided with engaged portions and said transparent sheet is attached to the lens in such a way that the engaged portions of the former are engaged with the engaging portions of the latter.

14. The lighting device for use with vehicles according to claim 1 wherein beads are continuously formed along the both longitudinal sides of the lens and the both longitudinal sides of the transparent sheet are continuously welded to the beads according to the ultrasonic welding technique.

15. The lighting device for use with vehicles according to claim 1, wherein said graduated pattern comprises a plurality of straight lines extending on the transparent sheet in the longitudinal direction thereof parallel to said first edge.

16. The lighting device for use with vehicles according to claim 1 wherein said graduated pattern comprises a plurality of dots.

17. The lighting device for use with vehicles according to claim 1, wherein said graduated pattern comprises a plurality of letters, figures, symbols or combinations thereof.

18. The lighting device for use with vehicles according to claim 1, wherein said graduated pattern is formed on the transparent sheet in decreasing density from said first edge to the center thereof and from a second edge parallel to said first edge to the center thereof, whereby the greatest amount of external light is shielded along said first and second edges.

19. The lighting device for use with vehicles according to claim 18, wherein said graduated pattern is formed on the transparent sheet in decreasing density from third and fourth edges perpendicular to said first and second edges to the center thereof.

20. The lighting device for use with vehicles according to claim 1, wherein said graduated pattern is printed on the transparent sheet.

21. The lighting device for use with vehicles according to claim 1, wherein said graduated pattern is colored in black.

22. The lighting device for use with vehicles according to claim 1, wherein said graduated pattern is formed on the transparent sheet in decreasing density from said first edge to a second edge parallel to said first edge.

23. The lighting device for use with vehicles according to claim 1, wherein said lens is provided with engaging portions while said transparent sheet is provided with engaged portions and said transparent sheet is attached to the lens in such a way that the engaged portions of the former are engaged with the engaging portions of the latter.

24. The lighting device for use with vehicles according to claim 1, wherein beads are continuously formed along the both longitudinal sides of the lens and the both longitudinal sides of the transparent sheet are continuously welded to the beads according to the ultrasonic welding technique.

* * * * *